Patented Jan. 6, 1953

2,624,761

UNITED STATES PATENT OFFICE 2,624,761

DICARBAMYLGUANIDINE SALTS

Donald W. Kaiser, Old Greenwich, Conn., assignor to American Cyanamid Company, New York, N. Y., a corporation of Maine No Drawing. Application July 13, 1949,
Serial No. 104,590

6 Claims. (Cl. 260—553)

The present invention relates to dicarbamylguanidine, a new compound, and its acid addition salts, and methods for their preparation.

The structure of dicarbamylguanidine presents tautomeric possibilities, namely:

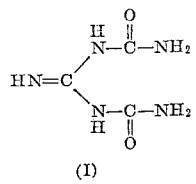 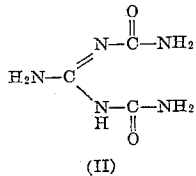

(I)   (II)

or I in equilibrium with II. Which of the three possibilities is the fact is not known. By "dicarbamylguanidine" therefrom is meant a member and/or equilibrium combination of the tautomeric system of I and II above.

The dicarbamylguanidines and their salts are useful in the preparation of synthetic resins, wetting agents, dyes, pharmaceuticals, and the like.

It is an object of this invention to prepare the dicarbamylguanidines by reacting a dicyanoguanidine, such as mono-potassium dicyanoguanidine, having the formula

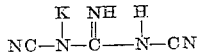

(or a tautomer thereof) or the like, with a non-halogen acid in aqueous solution. Other objects will be apparent from the discussion of the invention following.

It was not to be expected that the cyano groups of the dicyanoguanidines could be hydrolyzed to the corresponding carbamyl groups in acid solution without cyclization in view of the fact that the potassium dicyanoguanidine reacts with hydrochloric acid, hydrobromic acid, and hydroiodic acid in aqueous solution to give the respective hydro-halide salts of ammeline.

It has now been found, however, that if instead of a halogen acid, a strong oxygenated acid such as sulfuric, nitric, phosphoric, p-toluenesulfonic, or the like, is used, the result is a dicarbamylguanidine salt instead of an ammeline salt. As used in the specification and claims, "strong acid" refers to an acid having an ionization constant of $10^{-3}$ or greater.

The process is a general one for the dicyanoguanidines, and while dicyanoguanidine, free or containing organic substituents, may be used as such, it is preferred to liberate same in aqueous solution from one of their metal salts, as the free dicyanoguanidines when isolated are unstable. It is further preferred to use one of the alkali metal salts such as mono-potassium dicyanoguanidine, but any of the other salts, such as ammonium, zinc, calcium and the like, are suitable. The dicyanoguanidine salts, as well as the free compound, may be obtained by the process given in U. S. Patent 2,371,100.

In using a metal salt of a dicyanoguanidine it is necessary to add at least one mol of acid to combine with the metal in order to release the free dicyanoguanidine molecule, which then hydrolyzes to dicarbamylguanidine. However, better yields are obtained if a considerable excess of acid is used, excellent results being obtained when the acid:dicyanoguanidine ratio is about 5:1.

The following examples illustrate without limiting the invention.

EXAMPLE 1

*The reaction of potassium dicyanoguanidine with nitric acid*

64 cc. of 70% nitric acid and 64 cc. of water were mixed in a 3-neck flask equipped with stirrer and thermometer. This solution was then heated on the steam bath and 14.7 g. of powdered potassium dicyanoguanidine was added slowly in the absence of applied heat over a 15 minute period. The flask was occasionally cooled in a water bath to keep the temperature below 100° C. The flask was then replaced on the steam bath and heated for 15 minutes. It was then cooled to 10° C. to render the crystals of dicarbamylguanidine mononitrate less soluble and the solution was filtered. The crystals obtained were rinsed with acetone, giving 21 g. of a pure product decomposing at a temperature greater than 360° C.

EXAMPLE 2

*Preparation of dicarbamylguanidine*

Dicarbamylguanidine may be prepared by neutralizing any of its acid addition salts by a procedure analogous to the following.

Dicarbamylguanidine nitrate (62.4 g., 0.3 mol) was suspended in 350 cc. of water. 12.3 g. of sodium hydroxide dissolved in 100 cc. of water was added thereto and the mixture was heated to just boiling, whereupon a substantially clear neutral solution was obtained. The solution was cooled and the crystals filtered to provide 37 g. of dicarbamylguanidine melting at 176° C.

EXAMPLE 3

*The reaction of potassium dicyanoguanidine with sulfuric acid*

A solution containing 100 g. of potassium dicyanoguanidine in 300 cc. of water was added to a solution of 300 g. of 95% sulfuric acid in 200 cc.

of water and heated to reflux. A rather vigorous exothermic reaction occurred and the flask was cooled in an ice bath. The colorless crystals that separated were filtered and recrystallized from hot water. After filtration the colorless crystals were washed with methanol and acetone and allowed to dry. The product weighed 137 g., representing a 95% yield of dicarbamylguanidine neutral sulfate dihydrate of the formula

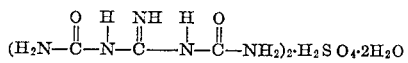

The product decomposed at 185°–186° C.

EXAMPLE 4

*The reaction of potassium dicyanoguanidine with phosphoric acid*

Using a procedure analogous to that of the preceding examples, a solution of 76 g. of 85% phosphoric acid (45 cc.) in 45 cc. of water was reacted with 14.7 g. of potassium dicyanoguanidine to form 23.1 g. of mono-(dicarbamylguanidine) phosphate. The decomposition point was 185° C.

EXAMPLE 5

*The reaction of potassium dicyanoguanidine with p-toluenesulfonic acid monohydrate*

Following a procedure analogous to that of the preceding examples, a solution of 63.4 g. of p-toluenesulfonic acid monohydrate in 50 cc. of water was reacted with 4.9 g. of potassium dicyanoguanidine to yield 10.4 g. of dicarbamylguanidine p - toluenesulfonate monohydrate. Decomposition occurred at 298–301° C. after recrystallization from water.

EXAMPLE 6

The salts of substituted dicyanoguanidine may also be hydrolyzed. For example, 1-cyclohexyl-2,3-dicyano-3-potassium guanidine may be hydrolyzed to provide the corresponding cyclohexyl substituted dicarbamylguanidine. The former compound is made by dissolving 82.5 g. of cyclohexylcyanoguanidine (prepared by the method of U. S. Patent 2,455,807) in 500 ml. of acetone. To this solution is added 64.6 g. of 86.6% potassium hydroxide. A slurry results. 25.5 ml. of cyanogen chloride vapor is added to the stirred slurry at 10°–12° C. over a two hour period, after which the mixture is stirred for an additional hour, filtered, and the solid product washed with acetone. The product consists of the potassium salt of the cyclohexyldicyanoguanidine together with potassium chloride. This mixture, after crystallization from hot water with treatment by activated charcoal, yields colorless plates of the potassium salt free of potassium chloride.

A solution of 100 g. of said potassium cyclohexyldicyanoguanidine in 300 ml. of water was added to 300 g. of concentrated sulfuric acid which had been diluted with 200 ml. of water. The mixture was heated to reflux, at which temperature an exothermic reaction occurred. The flask was cooled in an ice bath, and a small amount of insoluble material was filtered from the solution. Since the product did not crystallize on cooling, about two mols of sodium hydroxide was added to reduce the acidity. A solid separated and filtration gave 60 g. of cyclohexyldicarbamylguanidine neutral sulfate of the following formula (or tautomer thereof):

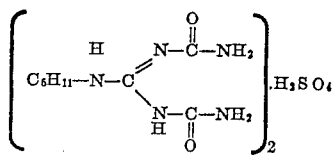

While the invention has been described with particular reference to specific embodiments, it is to be understood that it is not to be limited thereto but is to be construed broadly and restricted solely by the scope of the appended claims.

I claim:

1. A member of the group consisting of dicarbamylguanidine, cyclohexyldicarbamylguanidine, and the addition salts thereof with oxygenated acids having an ionization constant of at least $10^{-3}$.

2. Dicarbamylguanidine.

3. The addition salt of dicarbamylguanidine with an oxygenated acid having an ionization constant of at least $10^{-3}$.

4. Dicarbamylguanidine sulfate.

5. Dicarbamylguanidine nitrate.

6. Dicarbamylguanidine phosphate.

DONALD W. KAISER.

REFERENCES CITED

The following references are of record in the file of this patent:

UNITED STATES PATENTS

| Number | Name | Date |
| --- | --- | --- |
| 2,371,100 | Kaiser et al. | Mar. 6, 1945 |
| 2,481,758 | Kaiser et al. | Sept. 13, 1949 |

OTHER REFERENCES

Lakra, "J. Am. Chem. Soc.," vol. 51 (1929), page 2224.

Michael, "J. Prakt. Chem.," series 2, vol. 49 (1894), page 42.

Slotta et al., "Ber. deut. Chem.," vol. 63 (1930), pp. 208, 221 and 222.